(12) United States Patent
Aroudaki

(10) Patent No.: US 6,931,252 B1
(45) Date of Patent: Aug. 16, 2005

(54) INTERFERENCE ANALYSIS FOR A MOBILE RADIOTELEPHONE SYSTEM WITH ADAPTIVE ANTENNAE

(75) Inventor: Hicham Aroudaki, Bochum (DE)

(73) Assignee: Vodafone Holding GmbH, Düsseldorf (DE)

( * ) Notice: Subject to any disclaimer, the term of this patent is extended or adjusted under 35 U.S.C. 154(b) by 0 days.

(21) Appl. No.: 09/830,658

(22) PCT Filed: Sep. 24, 1999

(86) PCT No.: PCT/DE99/03146

§ 371 (c)(1),
(2), (4) Date: Sep. 12, 2001

(87) PCT Pub. No.: WO00/27147

PCT Pub. Date: May 11, 2000

(30) Foreign Application Priority Data

Oct. 30, 1998 (DE) ................................ 198 51 701

(51) Int. Cl.[7] .............................................. H04Q 7/20
(52) U.S. Cl. .................... 455/446; 455/63.1; 455/63.4; 455/67.13; 342/383; 343/757
(58) Field of Search ............................. 455/63.1, 63.4, 455/67.13, 501, 446, 452.2, 423–425; 342/383, 342/377; 343/757

(56) References Cited

U.S. PATENT DOCUMENTS

| | | | | |
|---|---|---|---|---|
| 5,768,687 A | * | 6/1998 | Marzoug | 455/63.1 |
| 5,940,033 A | * | 8/1999 | Locher et al. | 342/378 |
| 6,470,195 B1 | * | 10/2002 | Meyer | 455/562.1 |
| 2002/0002052 A1 | * | 1/2002 | McHenry | 455/447 |
| 2004/0131134 A1 | * | 7/2004 | Hiroyasu | 375/347 |
| 2004/0157645 A1 | * | 8/2004 | Smith et al. | 455/562.1 |

* cited by examiner

*Primary Examiner*—Sonny Trinh
*Assistant Examiner*—Marcos L Torres
(74) *Attorney, Agent, or Firm*—Cohen, Pontani, Lieberman & Pavane

(57) ABSTRACT

A method for interference analysis in a mobile radio network having an adaptive antenna in at least some of its cells and including traffic channels and control channels, includes calculating an interference ratio of interference of one traffic channel of an adaptive antenna of a first cell to a user signal in a traffic channel of an adaptive antenna of a second cell. The interference ratio of interference in a traffic channel of a first cell not having an adaptive antenna to a user signal is calculated in a traffic channel of a second cell having an adaptive antenna. The interference ratio of interference in a control channel of a first cell with or without an adaptive antenna to a user signal is calculated in a control channel of a second cell with or without an adaptive antenna relative to the entire surface of the cell without considering the adaptive antenna in each of these cells.

5 Claims, 8 Drawing Sheets

Definition of n antennas with n different beams

A base station equipped with adaptive antenna

INTERFERENCE ANALYSIS FOR A MOBILE RADIOTELEPHONE SYSTEM WITH ADAPTIVE ANTENNAE

CROSS REFERENCE TO RELATED APPLICATIONS

This is a U.S. national stage of application No. PCT/DE99/03146, filed on Sep. 24, 1999. Foreign priority is claimed on the following application(s) Country: Germany, Application No.: 198 51 701.7, Filed: Oct. 30, 1998.

BACKGROUND OF THE INVENTION

The invention relates to a method for interference analysis for a mobile radio network having adaptive antennas in at least some radio cells and comprising traffic channels and control channels.

In mobile radio networks, frequencies for traffic channels and control channels are issued several times, interference between traffic or control channels in one radio cell and control or traffic channels in another, for example, adjacent radio cell being permitted only up to a predetermined threshold value and any interference going beyond the threshold value being avoided in the frequency allocation to control channels and traffic channels which is based on interference analysis.

From the publication "A Heuristic Technique . . . ", IEEE Transactions on Vehicular Technology, 1979, Frank Box, an interference analysis for radio network planning in a mobile radio network is known.

SUMMARY OF THE INVENTION

The object of the present invention is an interference analysis which provides in as simple and efficient a manner as possible for radio network planning in a mobile radio network comprising adaptive antennas in at least some radio cells. The method according to the invention permits an efficient and high-quality, computer-aided interference analysis adapted to the peculiarities of a mobile radio network comprising adaptive antennas.

By using an adaptive antenna in a radio cell, the interference from and in this radio cell can be reduced. The adaptive antenna exhibits a number of highly directional antenna patterns (called beams in the further text) which can be separately activated in each case and cover adjacent overlapping local areas. A single directional beam is activated for each frequency and TDMA timeslot of the radio cell. Although the traffic channels for a radio cell are radiated via adaptive antennas of the base station of the radio cell, the control channels of a cell are sent out, as a rule, by a conventional antenna having a coverage area over the entire cell in order to make it as simple as possible to obtain a uniform reception of the control signals in the cell.

The method according to the invention and the frequency planning device according to the invention permit an efficient high-quality interference analysis of a mobile radio network comprising such antennas which can be performed with computer assistance.

Further features and advantages of the invention are obtained from the subsequent description of an exemplary embodiment, referring to the drawing, in which.

DETAILED DESCRIPTION OF THE PREFERRED EMBODIMENTS

Figure 1:
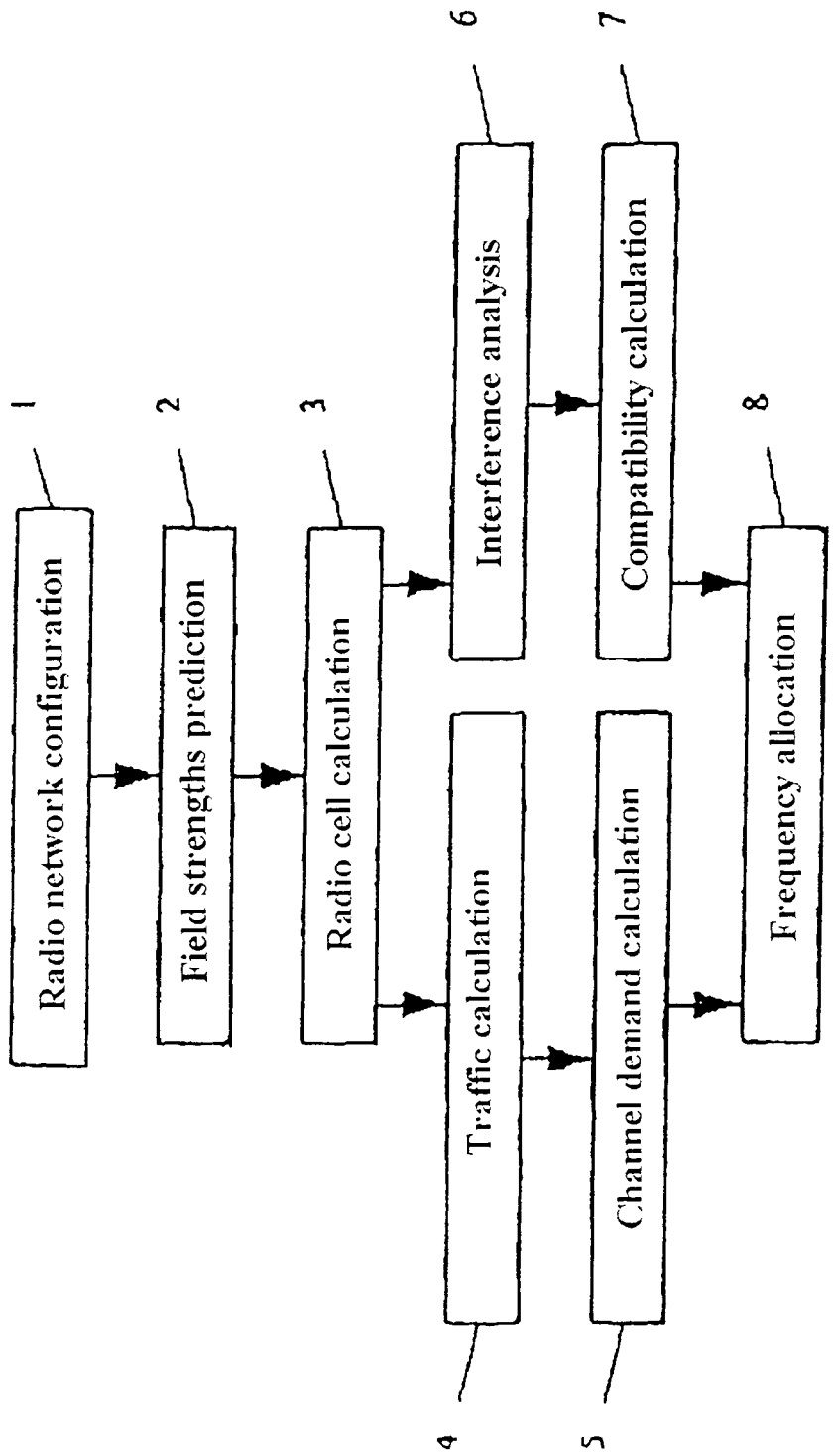
FIG. 1 shows the planning process for a conventional mobile radio network as a flowchart.

FIG. 1 shows the flow of the radio network planning process according to the analytical method for a conventional mobile radio network as a block diagram. After the radio network 1, the field strength prediction 2 and the cell area calculation 3 have been configured, a traffic calculation 4 and a channel request calculation 5 is performed per cell on the one hand, and, on the other hand, an interference analysis 6 of the interferences between the calculated (3) radio cells and a compatibility analysis 7 on the basis of calculated interferences (6) is performed, whereupon frequencies 8 are assigned to the radio cells.

Figure 2:
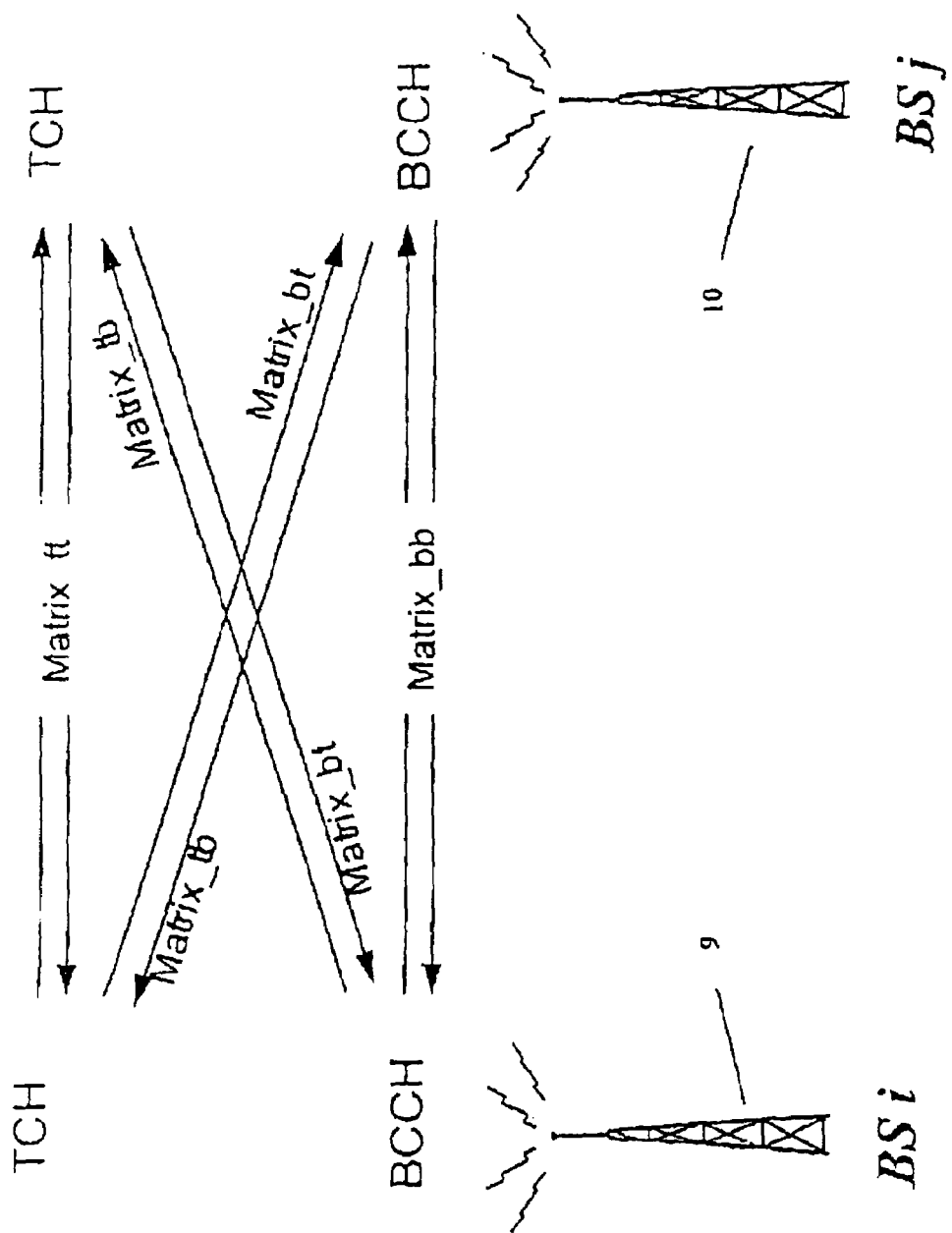
FIG. 2 shows the definition of channel-dependent interference matrices for a conventional mobile radio network comprising traffic channels and control channels.

FIG. 2 shows the base stations BSi 9 and BSj 10 for two cells of the mobile radio network. Both cells send and receive voice information via traffic channels TCH and radiate control information via control channels BCCH etc. However, the signals of the traffic channels TCH and control channels BCCH of the cell with BSi also inadvertently reach the cell with BSj and interfere with the signals sent out by BSj 10 on traffic channels and control channels. In doing so, traffic channels TCH of BSi and traffic channels TCH of BSj interfere (matrix_tt) with one another. As well, control channels BCCH etc. of BSi and BSj interfere (matrix_bb) with one another. Furthermore, the traffic channels of one cell in each case interfere (matrices_tb and _bt) with the control channels of the other cell.

To perform this interference analysis, the extent of the interference of user signals (=carrier=c) sent out in a cell with respect to the local intensity of the interference signals (=interference=I) sent out from another cell is investigated for TCH and BCCH in the entire mobile radio network. If the interference between two cells is too great, a co-frequency exclusion is defined for these two cells. In this arrangement, different threshold values (for matrix_tt, _tb, _bt, _bb) can be defined for the just permissible interference between two cells with regard to traffic channels TCH and control channels BCCH etc. The reason for this is the BCCH carrier is emitted with full power since important information is radiated on it. As a consequence of this situation, no interference-reducing measures such as, e.g. power control or frequency hopping, have any effect on a BCCH carrier. Due to the important information radiated via the BCCH, however, a BCCH carrier is also subject to a higher requirement for noise immunity than a TCH carrier.

The ratio between the interference with a user signal in one cell from signals radiated in from other cells is also called carrier-to-interference-ratio or interference ratio of user signal C to interference signal I.

Adaptive antennas have a relatively narrow coverage area per TDMA timeslot. Conventional interference analysis methods for analyzing the interference between a cell comprising an adaptive antenna and another cell with or without adaptive antenna are not easily suitable.

Figure 3:
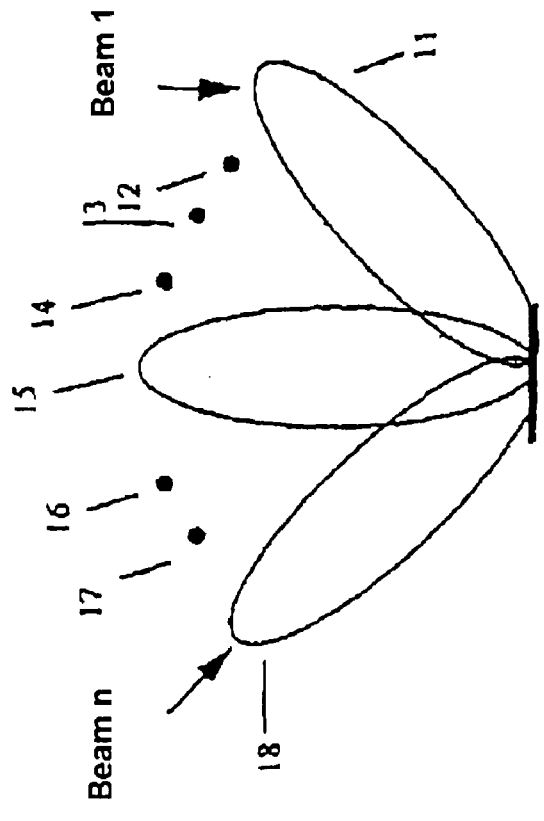
FIG. 3 shows the modeling of an adaptive antenna by a number of highly directional antennas having in each case a different antenna pattern (beam)
Figure 3:
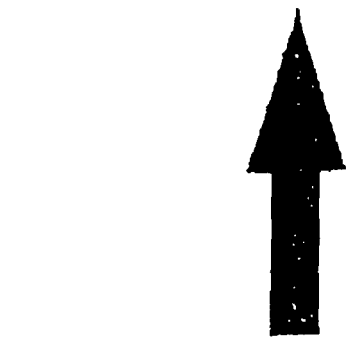
Figure 3:
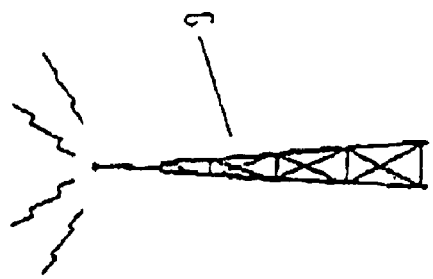

FIG. 3 shows the modeling of a base station with an adaptive antenna 9 by n different base stations having in each case a highly directional antenna, selected in the method according to the invention. The individual beams of these antennas are identified by reference symbols 11 to 18. The adaptive antennas provide for a reduction in the intercellular interferences since only a part area of the corresponding sector area is radiated for each TDMA timeslot. On the basis of this modeling, steps 2 to 6 of the planning process in FIG. 1 can be carried out.

Figure 4:
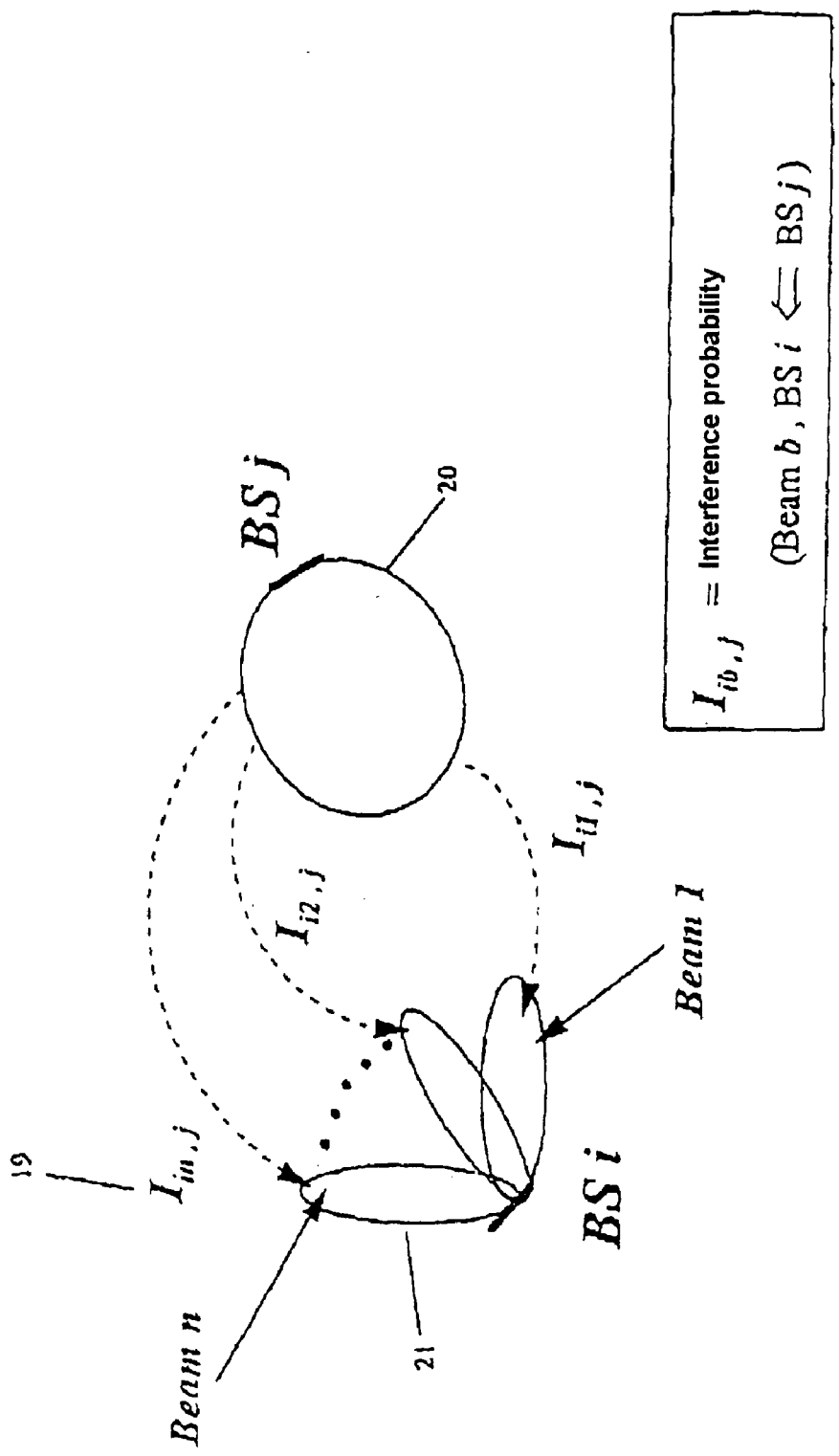
FIG. 4 shows the different entries for the interference between two radio cells obtained on the basis of the modeling in FIG. 3.

As illustrated in FIG. 4, this results in n entries in the interference matrix I_tt, for example for the interference between the radio cell of BSi (with adaptive antenna) and the radio cell of BSj (without adaptive antenna). For example $I_{in,j}$ 19 designates the probability of interference of the traffic channel signals radiated by BSj 20 with the traffic channel signals of the cell corresponding to beam n 21.

Analogously, (n×n) entries in the interference matrix are obtained for the interference between two cells, both of which are equipped with adaptive antennas. Since, however, one entry is in each case needed for the probability of interference from one cell to another for the compatibility calculation, the individual entries in FIG. 4 must be combined to form a single entry, taking into consideration the timeslot-oriented activation of the individual beams, which entry represents the equivalent probability of interference between the two cells.

Figure 5:
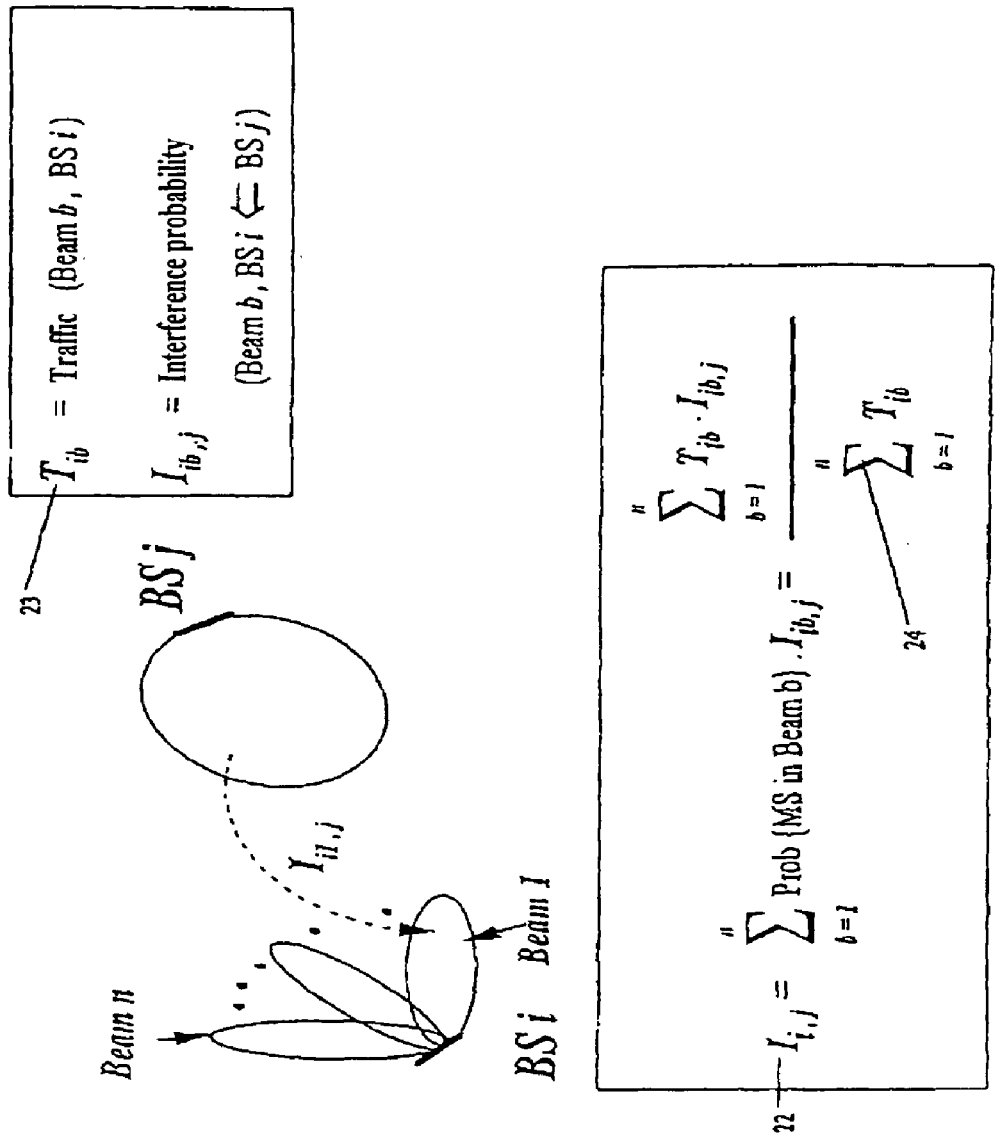
FIG. 5 shows the calculation of the probability of interference between a cell having an adaptive antenna and a cell having a conventional antenna.

FIG. 5 shows the determination of the equivalent interference probabilities $I_{i,j}$ 22 for the interference of traffic channel signals from a conventional antenna of the base station BSj with the traffic channel signals of a base station i equipped with an adaptive antenna. $T_{i,b}$ 23 here designates the traffic volume in this part-cell, the ratio of which to the total traffic 24 in cell i reproduces the probability for the activation of beam b. The equivalent interference probability thus provides the expected value for the probability of interference between cell i and cell j.

Figure 6:
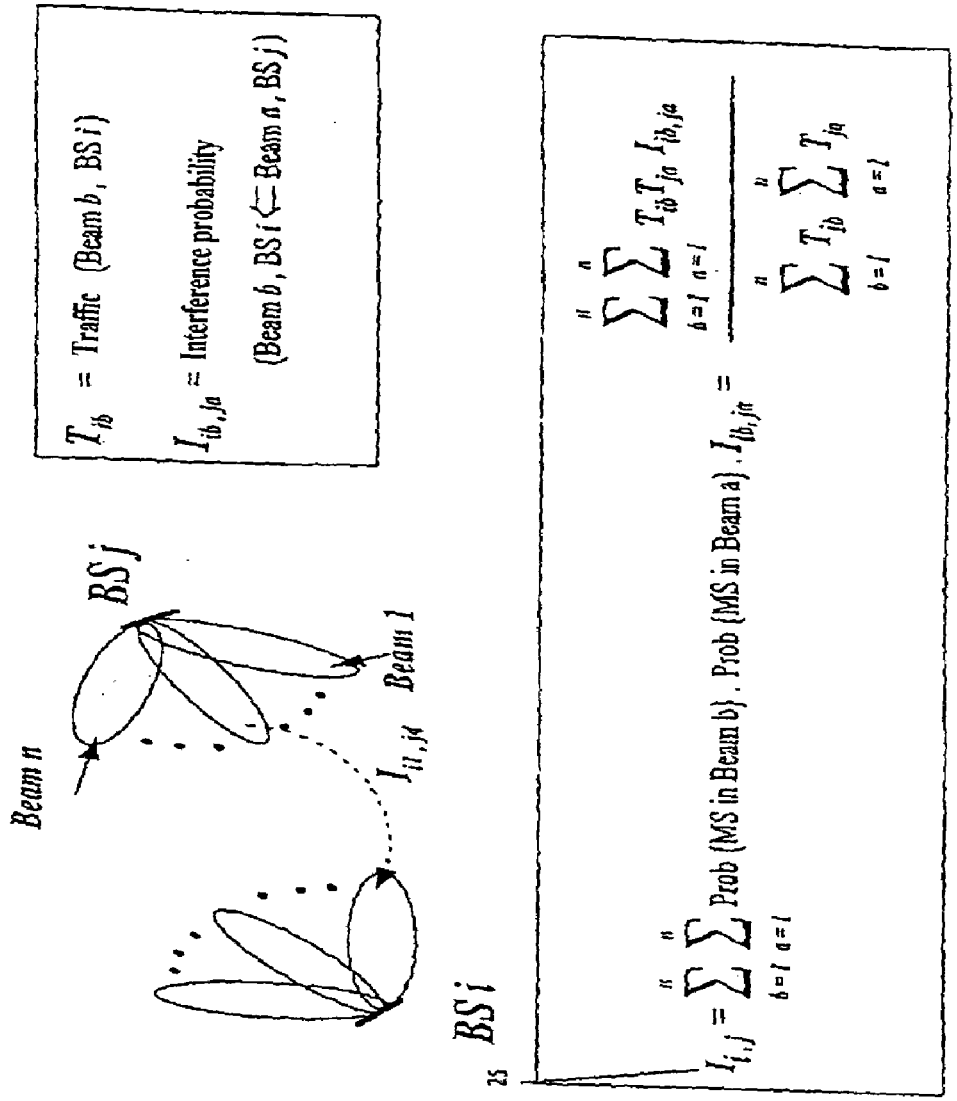
FIG. 6 shows the calculation of the probability of interference between two radio cells having in each case an adaptive antenna.

FIG. 6 shows the determination of the equivalent probability of interference 25 between the cell with BSj and the cell with BSi, both of which are equipped with adaptive antennas.

Figure 7:
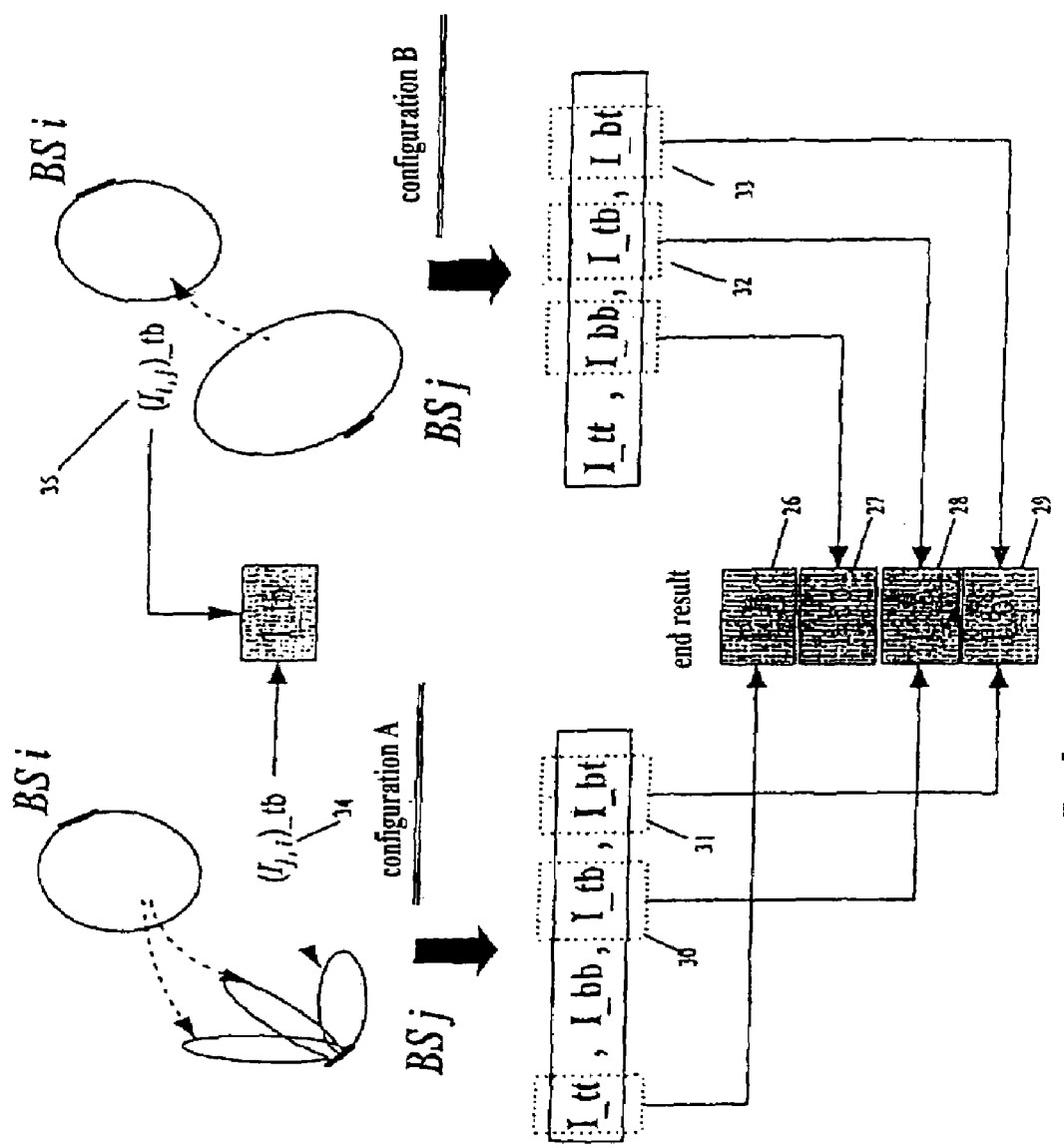
FIG. 7 shows the procedure in determining the channel-dependent matrices, taking into consideration adaptive antennas.
Figure 8:
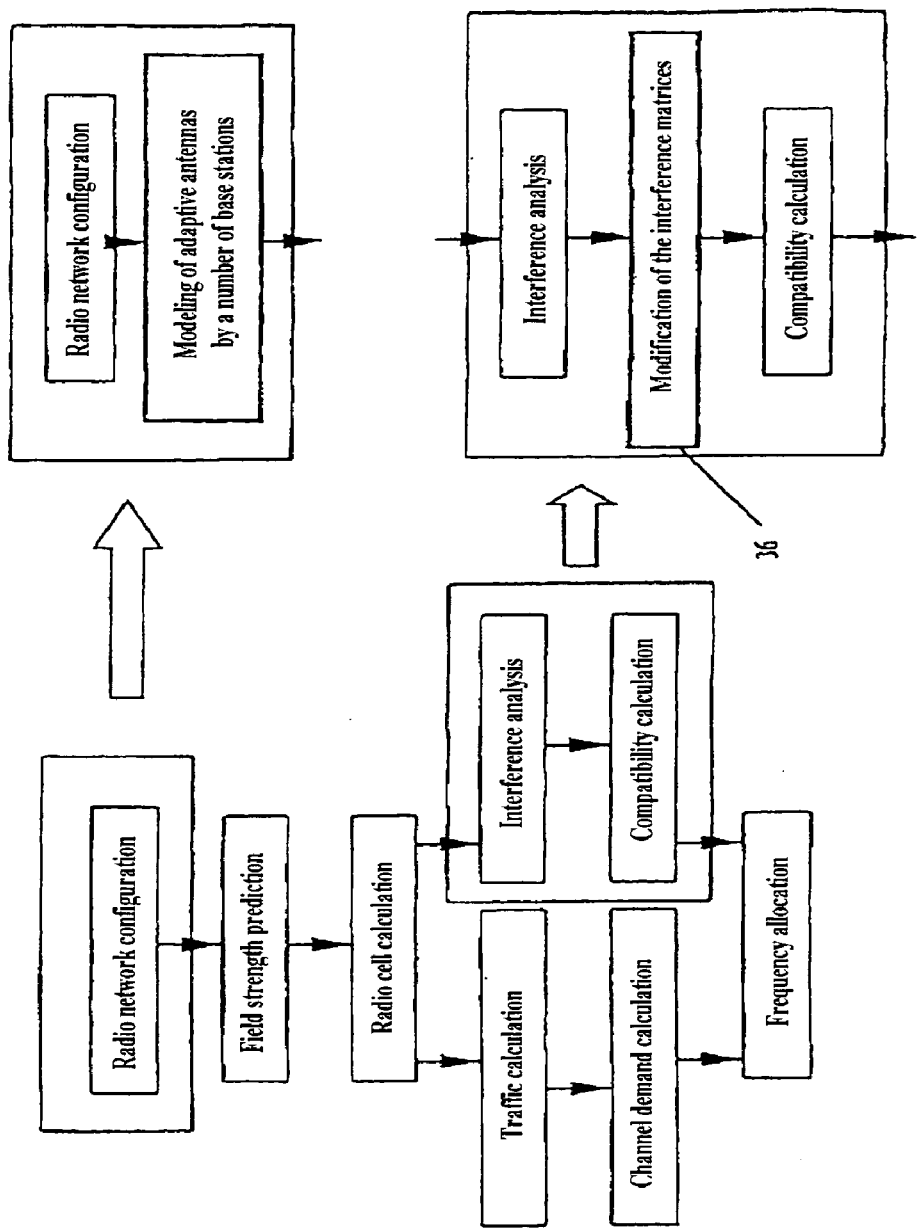
FIG. 8 shows the modified planning process.

FIG. 7 shows a procedure in the calculation of the matrices I_bb, I_tb, and I_bt. Since the control channels in a radio cell with adaptive antenna are radiated by a conventional antenna having a coverage area of the entire cell, another interference analysis (compared with FIGS. 5 and 6) must be used for the matrices I_bb, I_tb, and Ibt. For this reason, two configurations are considered at the same time in the interference analysis. On the one hand, the configuration with the adaptive antennas (configuration A in FIG. 7) and, on the other hand, the configuration with the sector antennas (configuration B in FIG. 7). In addition to the calculations for configuration A (steps 2 to 6 in FIG. 1), calculation steps 2, 3 and 6 in FIG. 1 are carried out for configuration B. Matrix I_tt 26 from the calculation for configuration A according to the procedure in FIGS. 5 and 6, is obtained for the end result. Matrix I_bb 27 is obtained from the calculation for configuration B. Matrices I_tb 28 and I_bt 29 are obtained from combining the mixed matrices 30, 31, 32 and 33. Thus, entry (Ij, i)_tb 34 is copied from matrix 30 and entry (Ii,j)_tb 35 is copied from matrix 32, for example for matrix I_tb 28. FIG. 8 shows the procedure in the radio network planning which is modified for a mobile radio network with adaptive antennas as a rough flowchart. Thus, modified interference matrices which take into consideration that, on the one hand, adaptive antennas of (at least some) radio cells of the mobile radio network have different main beam directions and thus different interferences with neighboring cells and on the other, control channels can also be driven uniformly for the radio cell in radio cells having adaptive antennas are calculated in step 36.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto."

What is claimed is:

1. A method for interference analysis for a mobile radio network comprising an adaptive antenna in at least some of its cells and having traffic channels and control channels, comprising the steps of: calculating, for mobile radio network frequency allocation planning, in each case an interference ratio of the interference of the traffic channels of an adaptive antenna of a first cell with traffic channels of an adaptive antenna of a second cell is calculated as a sum of the interference probabilities weighted with traffic values of individual part-cells, of the interferences of in each case one traffic channel of the adaptive antenna of the first cell with a user signal of in each case one traffic channel of the adaptive antenna of the second cell by adding the values of the traffic in all part-areas of the radio cell part-areas covered by the beams of the adapted antennas of the first and second cell; calculating the interference ratio of the interference of a traffic channel of a first cell without adaptive antenna with traffic channels of a second cell with an adaptive antenna as the sum of the interference probabilities weighted with the traffic values of the individual part cells, of the interferences of this traffic channel of the first cell with in each case one traffic channel of the adaptive antenna of the second cell by adding the values of the traffic in all part-areas of the radio cell part-areas covered by the beams of the adaptive antenna; and calculating the interference ratio of the interference of a control channel of a first cell with or without adaptive antenna with a control channel of a second cell with or without adaptive antenna referred to the total cell area from the user signal/interference signal ratio of these control channels in the total cell area in each case without taking into consideration any adaptive antennas of one or both of these cells.

2. A method as defined in claim 1, including specifying a different value as interference threshold value, above which a co-frequency exclusion of considered cells is defined, for the interference between traffic channels than for the interference between traffic channels and control channels.

3. A method as defined in claim 1, including covering a local part-area of the radio cell area with a beam of a radio cell.

4. A method as defined in claim 1, including defining the sum of the values of traffic in all part-areas of the radio cell part-areas covered by the beams of the adaptive antenna as traffic in an area covered by an adaptive antenna of a cell.

5. A frequency planning device for interference analysis of a mobile radio network having at least some cells comprising an adaptive antenna and having traffic channels and control channels which are operative: so that for mobile radio network frequency allocation planning, an interference ratio of the interference of the traffic channels of a first cell comprising an adaptive antenna with traffic channels of a second cell comprising an adaptive antenna to a user signal in a second cell is calculated as a sum of the interference probabilities weighted with traffic values of the individual part-cells, of the interferences of in each case one traffic channel of the adaptive antenna of the first cell with a user signal of in each case one traffic channel of the adaptive antenna of the second cell; so that the interference ratio of the interference of a traffic channel of a first cell without adaptive antenna with traffic channels of a second cell comprising an adaptive antenna is calculated as a sum of the interference probabilities, weighted with the traffic values of the individual part-cells, of the interferences of a traffic channel of the first cell with in each case one traffic channel of the adaptive antenna of the second cell; and so that the interference ratio of the interference of a control channel of a first cell with or without adaptive antenna with a control channel of a second cell with or without adaptive antenna referred to the total cell area is calculated from the user signal/interference signal ratio of these control channels in the total cell area in each case without taking into consideration any adaptive antennas of one of these cells.

* * * * *